(12) United States Patent
Nees et al.

(10) Patent No.: US 8,011,704 B2
(45) Date of Patent: Sep. 6, 2011

(54) BUMPER SYSTEM PROVIDING STORAGE AND ACCESSORY FUNCTIONS

(75) Inventors: Rainer B. Nees, West Olive, MI (US); Darin Evans, Spring Lake, MI (US); David B. Chon, Northville, MI (US)

(73) Assignee: Shape Corp., Grand Haven, MI (US)

( * ) Notice: Subject to any disclaimer, the term of this patent is extended or adjusted under 35 U.S.C. 154(b) by 405 days.

(21) Appl. No.: 12/118,346

(22) Filed: May 9, 2008

(65) Prior Publication Data

US 2008/0277950 A1      Nov. 13, 2008

Related U.S. Application Data

(60) Provisional application No. 60/917,147, filed on May 10, 2007.

(51) Int. Cl.
*B60R 19/02* (2006.01)
(52) U.S. Cl. ........................................................ 293/106
(58) Field of Classification Search .................. 293/106, 293/117; 224/489
See application file for complete search history.

(56) References Cited

U.S. PATENT DOCUMENTS

| | | | | |
|---|---|---|---|---|
| 2,993,721 A * | 7/1961 | Bowman | ........................ | 293/106 |
| 3,137,516 A * | 6/1964 | Cline | ........................... | 280/505 |
| 3,471,070 A * | 10/1969 | Olson | ............................. | 224/489 |
| 3,606,385 A * | 9/1971 | Johannes | ....................... | 280/422 |
| 3,614,136 A * | 10/1971 | Dent | ................................ | 280/500 |
| 3,866,949 A * | 2/1975 | Green | ............................ | 280/507 |
| 4,067,635 A * | 1/1978 | Solberg | .......................... | 439/574 |
| 4,127,295 A * | 11/1978 | Robinson | ....................... | 293/117 |
| 4,487,446 A * | 12/1984 | Reich, II | ......................... | 293/106 |
| 4,570,986 A * | 2/1986 | Sams | .............................. | 293/117 |
| 4,634,163 A * | 1/1987 | Bundy et al. | .................. | 293/117 |
| 4,674,782 A * | 6/1987 | Helber | ........................... | 293/106 |
| 4,676,415 A * | 6/1987 | Kennedy | ....................... | 224/489 |
| 4,738,464 A * | 4/1988 | Putnam | ......................... | 280/500 |
| 4,893,856 A | 1/1990 | Council | | |
| 4,901,895 A * | 2/1990 | Gancarz | ........................ | 224/491 |
| 4,993,610 A * | 2/1991 | Abretske et al. | .............. | 293/106 |
| D316,070 S * | 4/1991 | Riss | .............................. | D12/169 |
| 5,016,932 A * | 5/1991 | Carter | ........................... | 293/106 |
| 5,056,698 A * | 10/1991 | Kozakevich | .................. | 224/488 |
| 5,135,274 A | 8/1992 | Dodd | | |
| 5,230,552 A * | 7/1993 | Schipper et al. | ............ | 312/223.6 |
| 5,255,767 A * | 10/1993 | Norwood | .................. | 191/12.2 R |
| 5,340,177 A * | 8/1994 | Maxam | ......................... | 293/117 |
| 5,364,142 A | 11/1994 | Coiner | | |
| 5,611,695 A * | 3/1997 | Bentley | ............................ | 439/35 |
| 5,669,471 A * | 9/1997 | Unze | ......................... | 191/12.2 R |
| 5,799,991 A | 9/1998 | Glance | | |
| 5,803,216 A * | 9/1998 | McNaught | .................... | 191/12.4 |
| 5,823,585 A * | 10/1998 | Tanguay | ........................ | 293/106 |
| 5,979,953 A * | 11/1999 | Rinehart | ....................... | 293/106 |
| 6,080,014 A * | 6/2000 | Steiler | ........................... | 439/574 |

(Continued)

*Primary Examiner* — H Gutman
(74) *Attorney, Agent, or Firm* — Prince Heneveld LLP

(57) ABSTRACT

A bumper system includes a structural polymeric reinforcement beam and one or more trim components covering visible portions of the beam. The beam has a center section forming a step, and end sections that form corners of the vehicle. The trim component(s) is a thin, lightweight component surface finished for aesthetics. The beam includes functional features, such as a storage pocket with lockable cover, lighting and accessory mounts, electrical connectors for connection to trailer wiring, remote vehicle electrical power, and/or a hidden tow hook. The bumper system is configured to provide a class II hitch, but via add-on components, can be made to be Class III or IV.

14 Claims, 10 Drawing Sheets

U.S. PATENT DOCUMENTS

| | | | |
|---|---|---|---|
| 6,089,907 A * | 7/2000 | Shoblom | 439/528 |
| 6,179,103 B1 * | 1/2001 | Meyer | 191/12 R |
| 6,264,016 B1 * | 7/2001 | Bales | 191/12.4 |
| 6,419,289 B1 * | 7/2002 | Batten et al. | 293/117 |
| 6,460,908 B1 * | 10/2002 | Green | 293/117 |
| 6,581,955 B2 * | 6/2003 | Aquinto et al. | 280/500 |
| 6,598,914 B1 | 7/2003 | Dixon | |
| 6,783,266 B2 * | 8/2004 | McCoy et al. | 362/485 |
| 6,854,575 B1 * | 2/2005 | Desormeaux et al. | 191/12.4 |
| 7,156,433 B2 * | 1/2007 | Evans | 293/120 |
| 7,309,834 B1 * | 12/2007 | Byrd | 174/53 |
| 7,347,597 B2 * | 3/2008 | French | 362/485 |
| 7,377,563 B1 * | 5/2008 | Demick | 293/116 |
| 7,498,686 B2 * | 3/2009 | Capenos | 307/9.1 |
| 2004/0104557 A1 * | 6/2004 | Kaepp et al. | 280/495 |
| 2004/0108737 A1 * | 6/2004 | Evans | 293/117 |
| 2004/0232653 A1 * | 11/2004 | Kaepp et al. | 280/500 |
| 2005/0105296 A1 * | 5/2005 | French | 362/485 |
| 2006/0255602 A1 | 11/2006 | Evans | |
| 2008/0272699 A1 * | 11/2008 | Capenos | 315/77 |
| 2009/0242600 A1 * | 10/2009 | Helms et al. | 224/489 |

\* cited by examiner

BUMPER SYSTEM PROVIDING STORAGE AND ACCESSORY FUNCTIONS

This application claims benefit under 35 U.S.C. §119(e) of provisional application Ser. No. 60/917,147, filed May 10, 2007, entitled BUMPER SYSTEM PROVIDING STORAGE AND ACCESSORY FUNCTIONS, the entire contents of which are incorporated herein by reference.

BACKGROUND

The present invention relates to vehicle bumper systems incorporating basic structural components for function, and also trim components for aesthetics, both also supporting increased flexibility of design and reduced weight.

Vehicle bumpers must be sufficiently strong to provide their intended function of impact absorption. However, weight reduces gas mileage, especially weight that is forward of the front wheels (or rearward of the rear wheels). An arrangement is desired that maintains design and styling flexibility, but that allows impact and strength criteria to be met while also minimizing weight. In particular, bumper systems are desired where structural components can be used across multiple vehicle lines, yet with trim components that maintain the ability to distinguish and differentiate the appearance of different product lines.

Further, it is desirable to provide improved function on bumper systems. For example, it is desirable to provide functional features for utility and convenience, but that can be hidden for aesthetics and even locked for security. For example, electrical connectors, tow hooks, and storage compartments are desired that are easily accessible but that can be covered and locked.

Known bumper systems use different frame-attached bracketry for different classes of hitches (i.e., to handle different trailer weights). Usually, "old" bracketry is discarded and new bracketry is used when a trailer hitch is upgraded to a higher weight hitch. It is desirable to provide a hitch where upgrades don't require removal and disposal of "old" hitch components.

Thus, a system having the aforementioned advantages and solving the aforementioned problems is desired.

SUMMARY OF THE PRESENT INVENTION

In one aspect of the present invention, a bumper system includes a bumper system for a vehicle including a structural reinforcement beam and one or more trim components covering visible portions of the beam. The beam has a center section forming a step, and end sections forming corners of the vehicle. The one or more trim components are relatively thin, lightweight parts having visible surfaces finished for aesthetics. The beam includes one or more functional components selected from a group consisting of: a storage pocket, a lighting mount, an accessory mount, an electrical connector for connection to trailer wiring, an electrical connector providing for a remote hookup to electrical power on an exterior of the vehicle, and a recess for receiving a tow hook in a partially hidden position. At least one of the trim components partially covers the functional component.

In another aspect of the present invention, a bumper system includes a bumper system for a vehicle including a structural reinforcement beam and one or more trim components covering visible portions of the beam. The beam has a center section and end sections forming corners of the vehicle. The one or more trim components are relatively thin, lightweight parts having visible surfaces finished for aesthetics. The beam includes a recess and a lockable door for covering the recess.

In still another aspect of the present invention, a bumper system includes a bumper system for a vehicle including a structural reinforcement beam and one or more trim components covering visible portions of the beam. The beam has a center section and end sections forming corners of the vehicle. The one or more trim components are relatively thin, lightweight parts having visible surfaces finished for aesthetics. The beam includes at least one electrical connector thereon and means for covering and locking out access to the electrical connector.

In still another aspect of the present invention, a bumper system for a vehicle includes a structural reinforcement beam and one or more trim components covering visible portions of the beam, the beam having a center section and end sections forming corners of the vehicle. At least one of the trim components covers an end portion of the beam and includes an outer skin subcomponent with an outer surface treated for aesthetics and an inner stiffening subcomponent attached to a hidden surface of the outer subcomponent. The inner subcomponent includes integrally formed attachment structures for mating with and attachment to one of the beam end sections. The outer surface of the outer skin subcomponent has a three-dimensional shape. In a narrower form, the inner subcomponent is insert-molded onto the outer skin subcomponent.

In yet another aspect of the present invention, a bumper system includes a structural reinforcement beam and one or more trim components attached to and covering visible portions of the beam. The beam has a center section and end sections forming corners of the vehicle. At least one of the trim components includes a metal outer skin subcomponent with visible surface treated for aesthetics, and a polymeric stiffening subcomponent attached to and supporting the outer skin subcomponent. The stiffening subcomponent includes integrally-formed attachment structure secured to the beam.

An object of the present invention is to provide an insert-molded trim component with a lightweight plastic backer and a thin metal front surface-treated for aesthetics.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
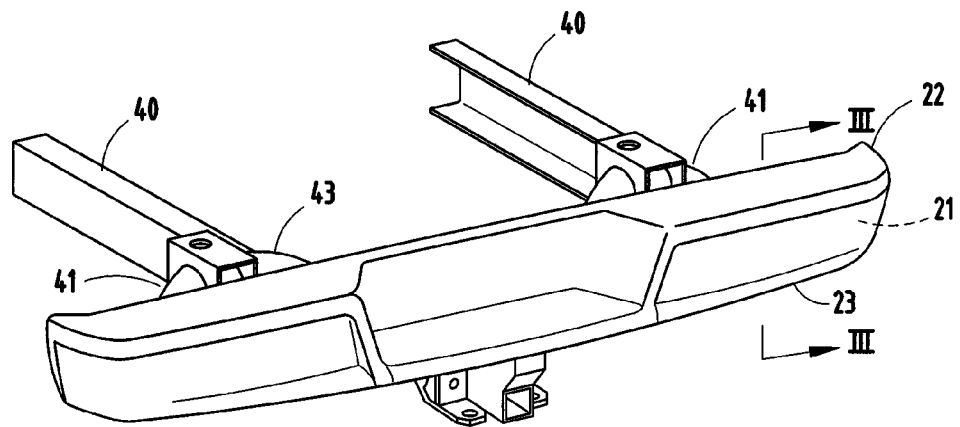
FIG. 1 is a perspective view of a rear bumper system incorporating the present invention, the bumper system being a step bumper and providing a tow hitch.

A bumper system 20 (FIGS. 1-3) includes a structural polymeric reinforcement beam 21 constructed for strength and light weight, and a plurality of trim components, such as a polymeric upper trim component 22 (also called a "cover" herein) forming a rough tread surface for non-slip support of a person standing thereon, and pairs of non-structural lower trim components 23 for aesthetically finishing the bumper system. As discussed below, the beam 21 can be constructed to include one or more functional features, such as a lockable/coverable storage pocket, a lighting mount, other accessory mounts, an electrical connector for connection to trailer wiring, one or more additional electrical connectors such as for providing remote electrical power at an exterior location on the vehicle, a recess for receiving a tow hook in a partially hidden position, and/or an access hole for accessing the spare tire cable-winch storage arrangement. Further, variations of beam 21 can be provided, such that a particular model style of vehicle can be given a wide variety of different looks and functional features, without dramatically adding to tooling and manufacturing costs for the vehicles. Still further, the present bumper system 20 allows dramatically different styling changing without the need to revalidate the bumper system 20, which in itself is a tremendous advantage in terms of reduced part cost, shortened lead times, and improvements in efficiencies and overall cost of bumper development programs.

The beam 21 has a shelf-forming center section 24 forming a center step 25 and end sections 26 that extend from the center section 24 to form a license plate pocket. The upper trim component 22 covers a top surface of an upper front surface of the beam 21 and extends downwardly a distance partially onto a face surface of the beam 21. The illustrated upper trim component 22 has an upper roughened tread surface along its center and ends that is conducive for non-slip support of a person standing thereon. The pair of non-structural lower trim components 23 cover lower portions of the front surface on the end sections 26. The trim components 23 (and 22) are preferably made from relatively-thin, tough, resilient lightweight material, such as plastic, metal, composite, or other material. Outer surfaces of the components 22 and 23 can be treated for aesthetics and durability (such as paint, chrome, brushed stainless steel, stained, textured, wood-grain, or other appearance).

Figure 2:
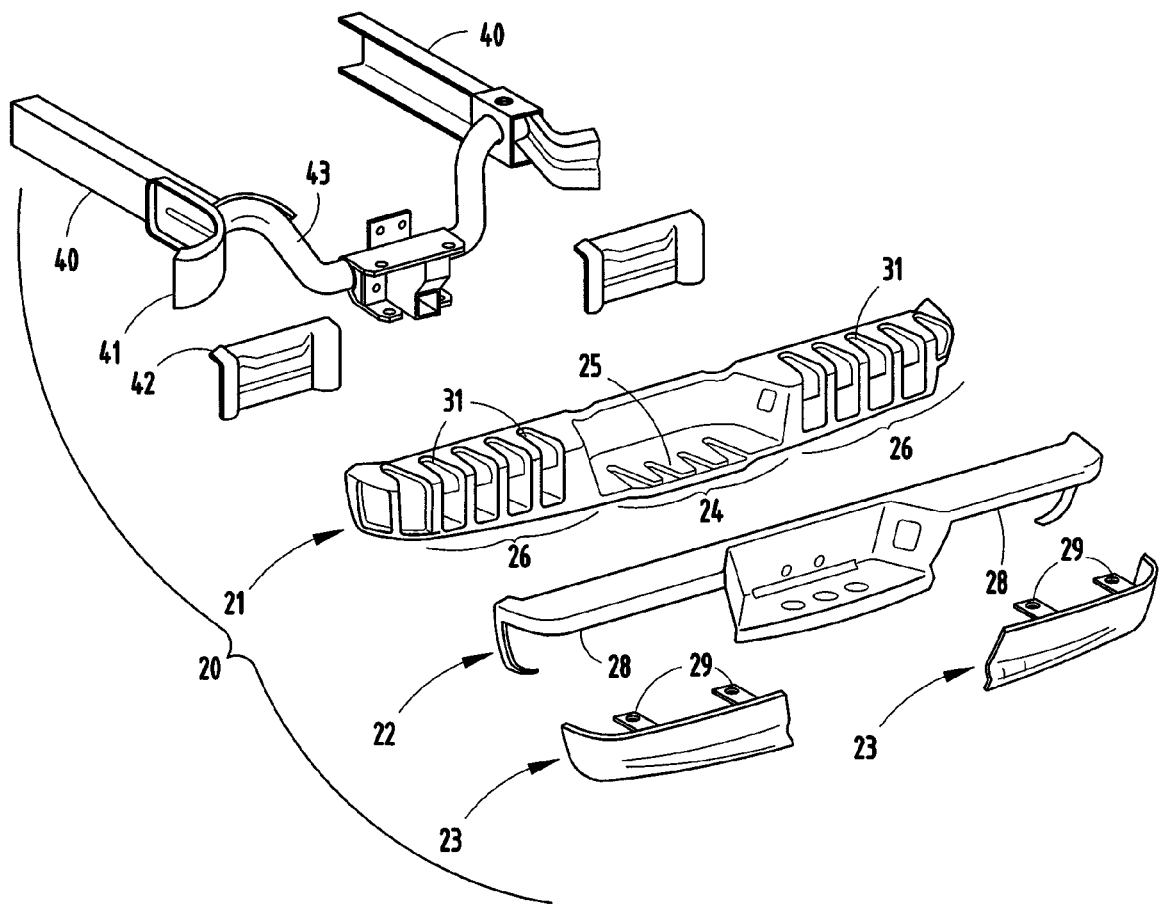
FIG. 2 is an exploded view of FIG. 1.
Figure 3:
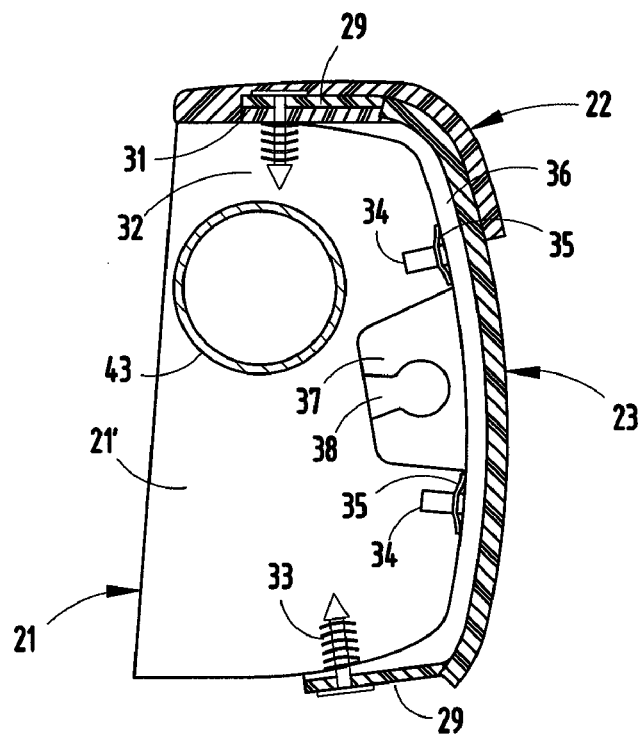
FIG. 3 is a cross section taken along line III-III in FIG. 1.

It is contemplated that different trim attachment methods can be used. As illustrated in FIG. 2), a plurality of apertured flanges 29 extend rearwardly from upper and lower edges of the lower trim component 23. The flanges 29 are configured to fit into mating recesses 31 in the top and bottom of beam 21, where their holes align with holes in the beam 21. The upper trim component 22 (FIG. 3) includes vertically extending frictional fasteners 32 and 33 that extend through the aligned holes in the component 23 and beam 21. Notably, the illustrated top fastener 32 includes a head pre-attached to an underside of the upper trim component 22 such that its head is hidden under the upper trim component 22 in a non-visible position. The illustrated bottom fastener 33 (sometimes called a "Christmas tree" fastener due to the appearance of the reversely-formed friction-generating barbs on its shaft) includes an enlarged head that abuts the material around the hole in the illustrated bottom flange. However, due to its low position, it is generally not visible to a person standing near the vehicle. It is contemplated that additional retainers can be provided, such as rearwardly-extending protrusions 34 that extend from a mid portion of the lower trim component 23 into holes in the beam 21. The illustrated protrusions 34 extend into sheet-metal nut-like retainers 35, but of course other frictional fasteners can be used.

It is contemplated that the illustrated trim components 22 and 23 (FIG. 3) may be attached to the beam 21 with a slight gap or space 36 therebetween. Initial testing has shown that some space may be desirable to allow play in the body of the components 22 and 23, allowing them to resiliently flex and shift a small amount during a light impact/collision, thus avoiding permanent deformation and damage. It is contemplated that this feature can be used to provide a "soft" initial impact, thus providing improved pedestrian safety during a vehicle impact. A pocket 37 can be formed in the beam 21, such as for supporting a rear tail light 38 or turn signal or license plate light.

The beam 21 (FIG. 1) is attached to the vehicle frame side rails 40 by a pair of side rail brackets 41 and a pair of corner support brackets 42, each of which interconnect with and support a tubular metal cross beam 43. The beam 21 is also attached to the brackets 41-42 and to the cross beam 43, such that the assembly forms a solid bumper structure, such as for providing a bumper capable of supporting a rated hitch, as discussed below. A rear surface of the plastic structural beam 21 includes an elongated recess formed in a matrix of honeycomb-forming crisscrossing ribs in the back side 21' of the beam 21 that are shaped to matably closely receive the cross beam 43, such that the cross beam 43 supports the beam 21 and adds considerable strength to the overall bumper system 20. A center of the beam 43 extends under and supports the step 25 for structural support of the step 25 and of a hitch, as discussed below. The tubular shape of the cross beam 43 allows it to have a very high strength-to-weight ratio, which when combined with the light weight and strength of the structural plastic beam 21, results in a surprisingly and unexpectedly lightweight bumper assembly that is as much as 17 pounds lighter in weight than a comparable traditional bumper system with metal beam (based on a replacement design for an existing "traditional" full-stamped bumper system where a 30%-40% weight saving was achieved).

In the following text, several additional bumper systems are described. In those bumper systems, identical and similar bumper components and features are identified with identical numbers but with the addition of a letter, such as "A," "B," "C," etc. This is done to reduce redundant discussion.

Figure 4:
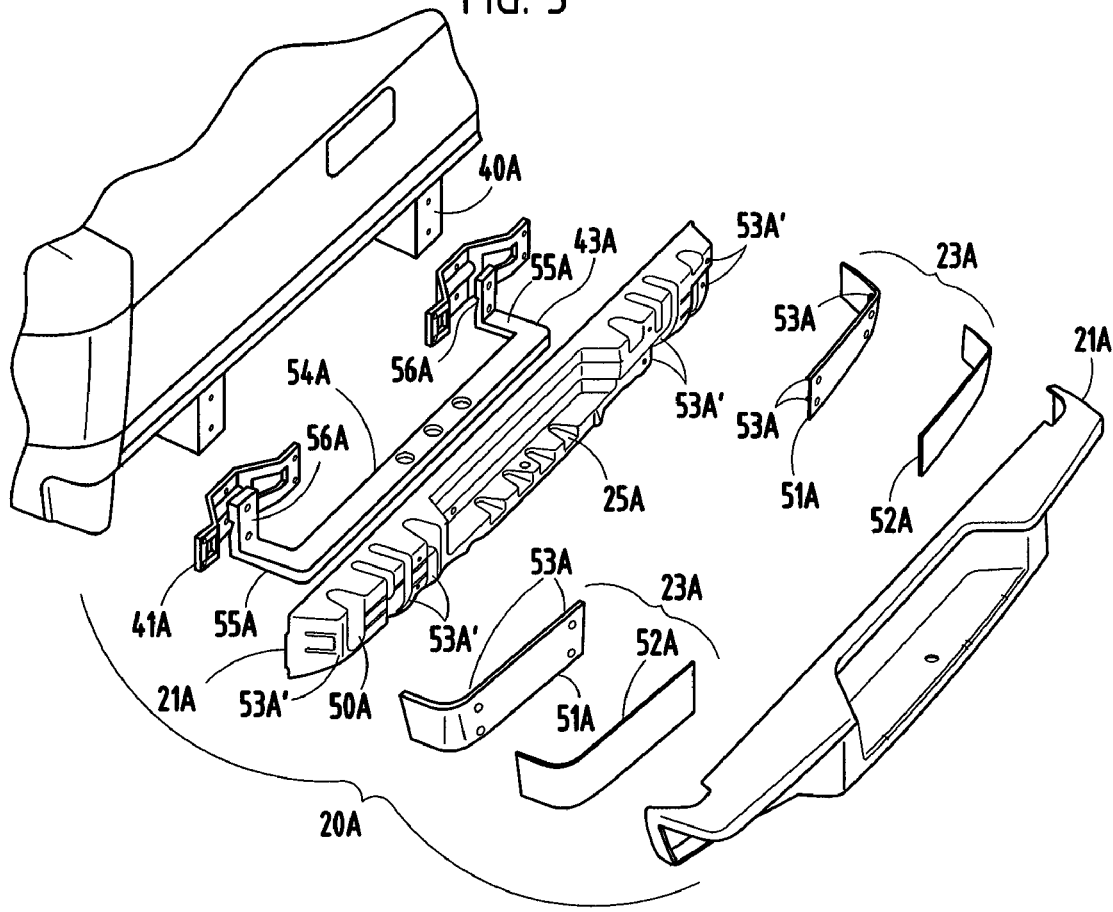
FIG. 4 is an exploded perspective view of a second bumper system similar to FIG. 1, the bumper system being a Class II hitch.

Bumper system 20A (FIG. 4) discloses a step bumper including a structural polymeric reinforcement beam 21A, and upper and lower trim components 22A and 23A for aesthetically finishing the bumper system 20A. The bumper system 20A is attached to the vehicle frame side rails 40A by a pair of side rail brackets 41A and includes a tubular metal cross beam 43A. A rear surface of the plastic structural beam 21A includes an elongated recess shaped to matably receive the cross beam 43A, such that the cross beam 43A supports the beam 21A including step 25A. Their combination adds considerable strength to the overall bumper system 20A.

The beam 21A (FIG. 4) includes integrally-formed mounting pockets 50A for receiving and supporting a rear tail light if desired. The lower trim 23A includes a mounting plate 51A and an aesthetic thin sheet of material 52A surface treated for aesthetics and bonded (or otherwise secured) to the mounting plate 51A. Notably, the lower trim 23A can be replaced with a similar trim modified to include an aperture, so that a light bulb mounted in pocket 50A is visible. The mounting plate 51A includes rearwardly-extending studs 53A that extend into holes 53A' in the beam 21A, and that engage sheet metal frictional retainers embedded in the beam 21A. Notably, the illustrated sheet of material 52A is chrome plated, but it is contemplated that it could be painted, brushed stainless steel, composite, wood-simulating materials, or another material. It is also noted that the cover sheet 52A is forwardly curved from the mounting plate 51A, to form a rounded (non-flat) aesthetic appearance. It is contemplated that this arrangement can provide some increased pedestrian safety upon a vehicle impact, and also that this can provide a distinctive different appearance.

The illustrated cross beam 43A is a solid bar bent to shape, with three holes along its horizontal section 54A for supporting different ball hitches, rearward sections 55A, and apertured up sections 56A for connection to the bracket 41A and to rails 40A. The horizontal section 54A extends under and supports the step 25A, such that the illustrated arrangement qualifies as a Class II hitch structure (i.e., 2001 to 3500 lb. gross trailer weight).

Figure 5:
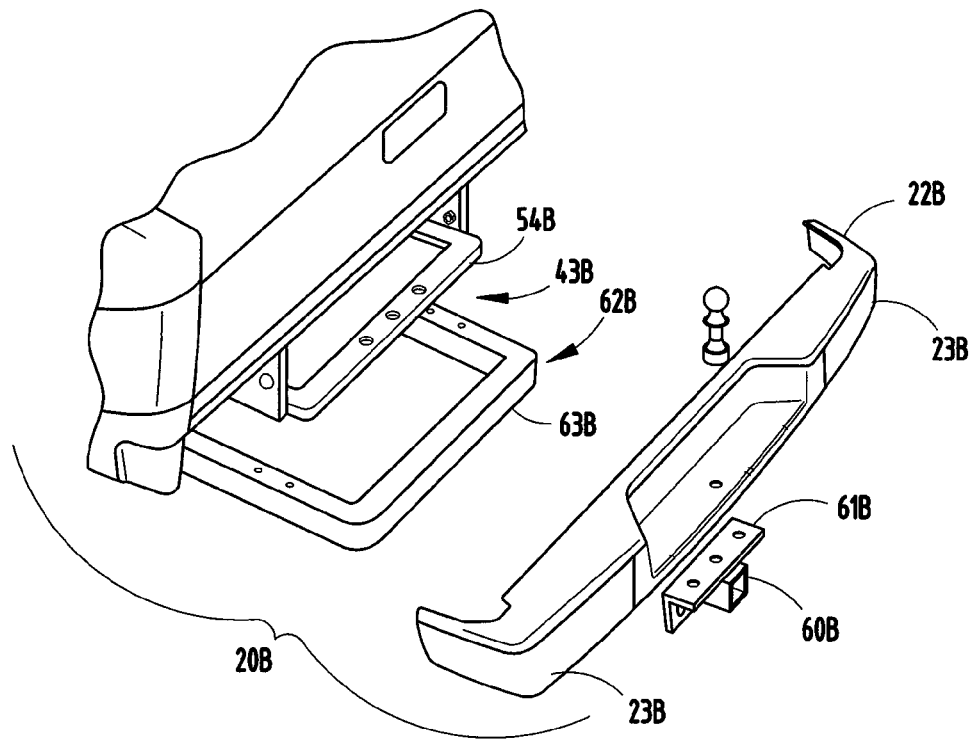
FIG. 5 is an exploded perspective view of a third bumper system similar to FIG. 4, but with add-on support components shown for upgrading the system to be a Class III or Class IV hitch.

The bumper system 20B (FIG. 5) starts with the components of bumper system 20A, but further includes an "add-on" hitch tube 60B and L-shaped mounting bracket 61B attachable under and to a center of the horizontal section 54B of the cross beam 43B to upgrade the hitch to a Class III hitch (i.e., 3501 to 5000 lb. gross trailer weight). Still further, a U-shaped tubular metal support member 62B is provided for upgrading the hitch to a Class IV hitch (i.e., 5001 to 10,000 lb. gross trailer weight). The support member 62B includes a center portion 63B that is positioned below and slightly rearward of a bottom of the horizontal section 54B. The bracket 61B is shaped to be bolted to both a center 63B of the support member 62B as well as to the horizontal section 54B of the beam 43B. Also, rear ends 64B of the U-shaped support member 62B can be bolted directly to the vehicle frame at location with upwardly extending bolts. Notably, the components 61B and 62B can be "added to" existing vehicle components. The resulting structure uses existing components, rather than requiring existing hitch components be thrown away when upgrading a hitch to a higher weight class. This is particularly advantageous to vehicle manufacturers, since it is environmentally friendly by reducing scrap, promotes a quality and consistency to the upgraded hitch system, and is a robust and aesthetically attractive system.

Figure 6:
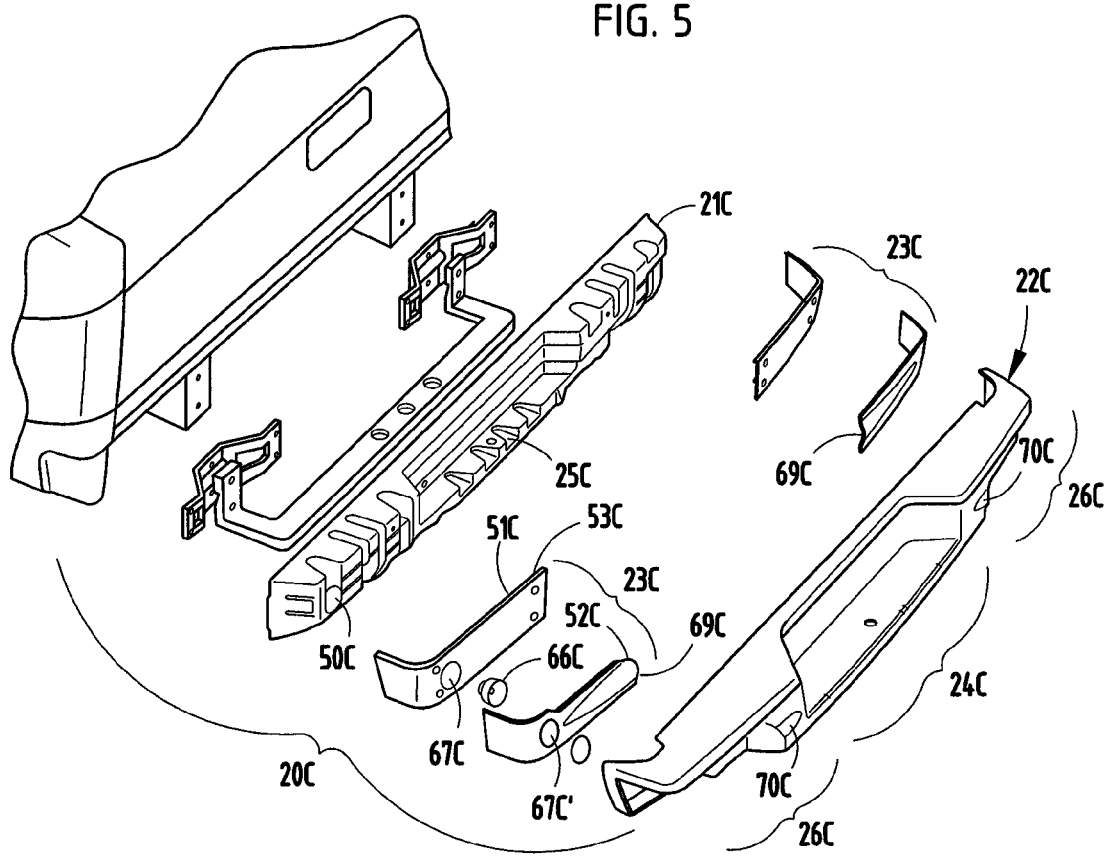
FIG. 6 is an exploded perspective view of a fourth bumper system where the reinforcement beam includes mounts for supporting rear vehicle lights.

The beam 21C (FIG. 6) includes integrally-formed mounting pockets 50C on beam 21C for receiving and supporting a rear tail light assembly 66C. The lower trim 23C includes a mounting plate 51C and an aesthetic thin sheet of material 52C that is surface treated for aesthetics and bonded to mounting plate 51C. Notably, the mounting plate 51C of the lower trim 23C includes an aperture or mounting pocket 67C. The pockets 50C and/or the lower trim 23C includes apertured bosses for receiving attachment screws for securing the light assembly 66C in place, so that the light assembly 66C can be securely mounted in the pocket 50C and/or aperture 67C in a position to shine through the aperture 67C' in the cover sheet of material 52C. The mounting plate 51C includes rearwardly-extending studs 53C that extend into holes in the beam 21C, as previously discussed in regard to beam 21A. The cover sheet of material 52C is formed to have an embossed bullet-shaped ridge 69C that aesthetically matches up to a curved shape 70C formed on the inboard part of end sections 26C of trim 22C adjacent the step 25C.

Figure 7:
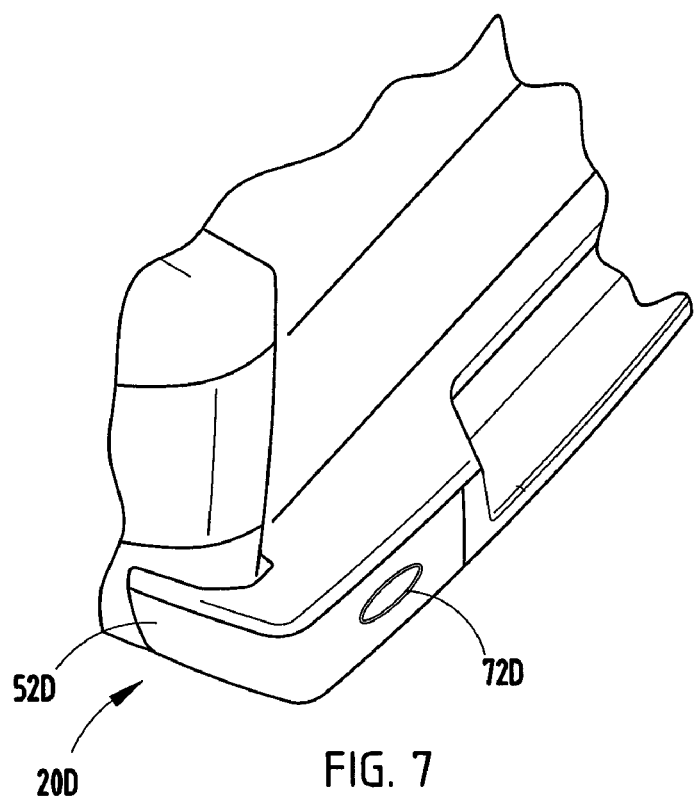
FIGS. 7-8 are perspective views of fifth and sixth bumper systems with trim having a logo for brand recognition, FIG. 7 showing a surface-formed emblem and FIG. 8 showing a backlit emblem.
Figure 8:
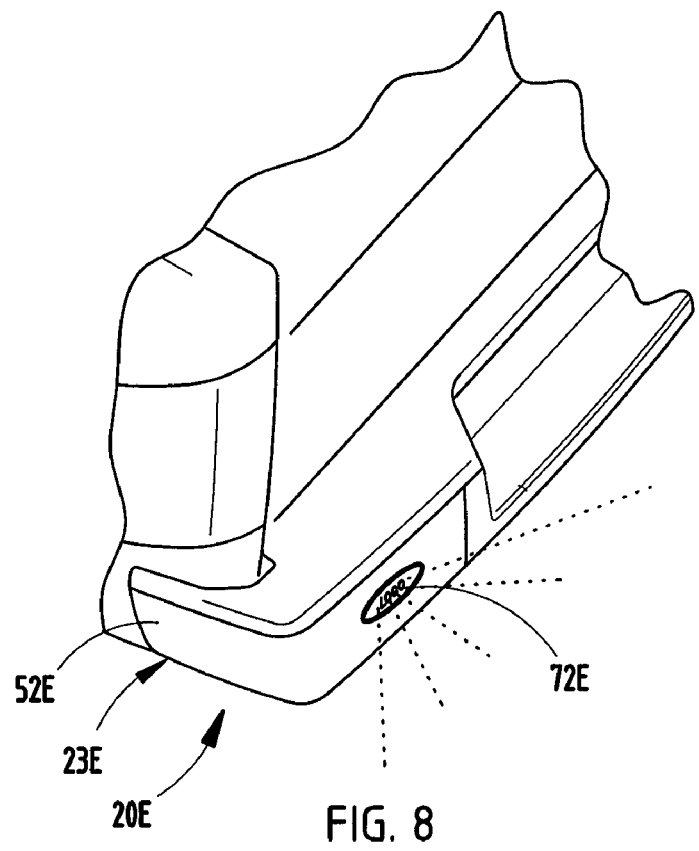

The bumper system 20D (FIG. 7) is similar to bumper system 20A but the aesthetic thin sheet of material 52D is embossed, laser cut, molded or painted to include an integrally-formed emblem 72D in its face. The bumper system 20E (FIG. 8) is similar to bumper system 20D, but the lower trim component 23E includes a sheet of material 52E that is translucent (or made sufficiently thin or with a pattern of tiny holes). The mounting plate 51E includes an aperture, and a light is mounted in the aperture. (See FIG. 1, light 38.) When lit, a distinctive backlit design occurs on the emblem 72E.

Figure 9:
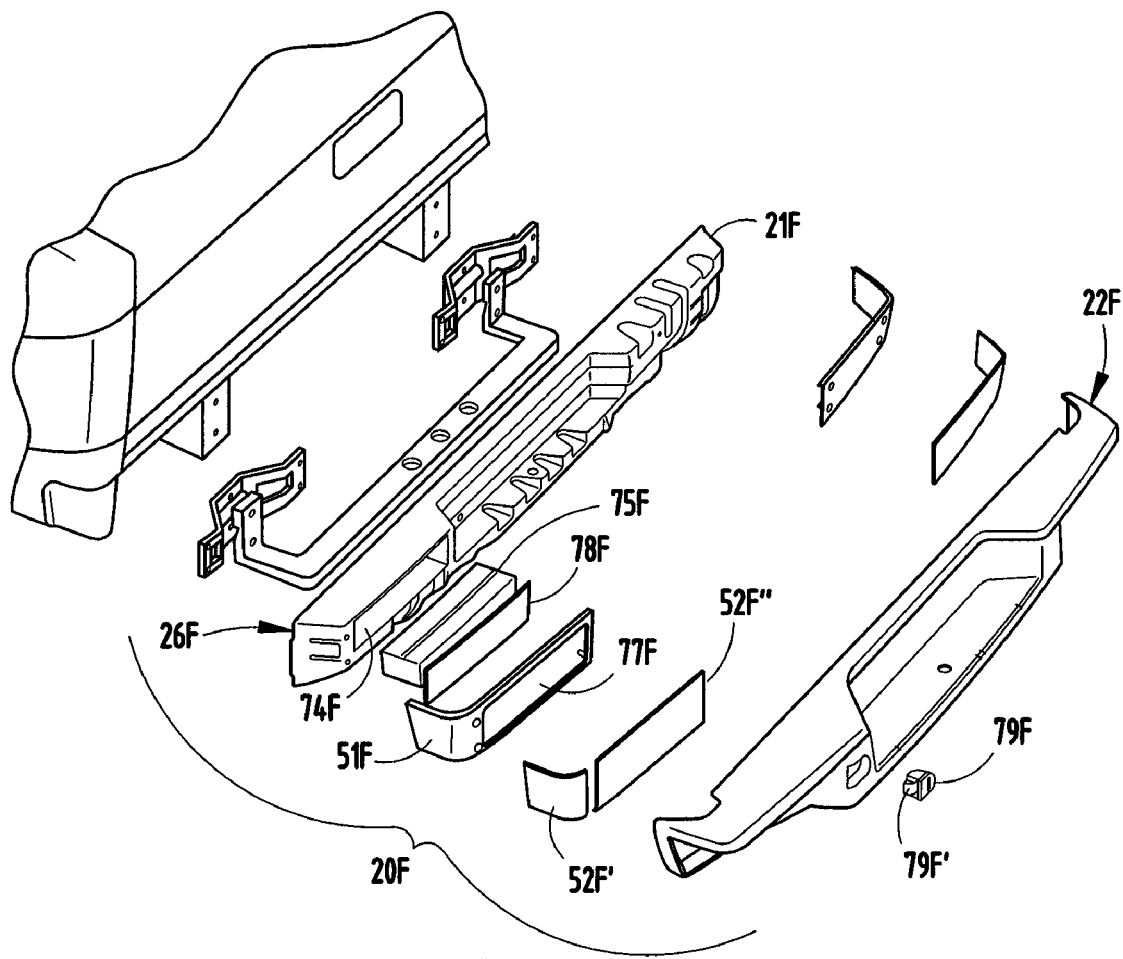
FIGS. 9-10 are exploded and assembled perspective views of a seventh bumper system with a pocket formed in an end section of the beam, and a slide-out storage bin positioned in the pocket, the bin having matching trim attached to a visible portion of the bin and a lock either in the bin or in the beam adjacent the pocket.
Figure 10:
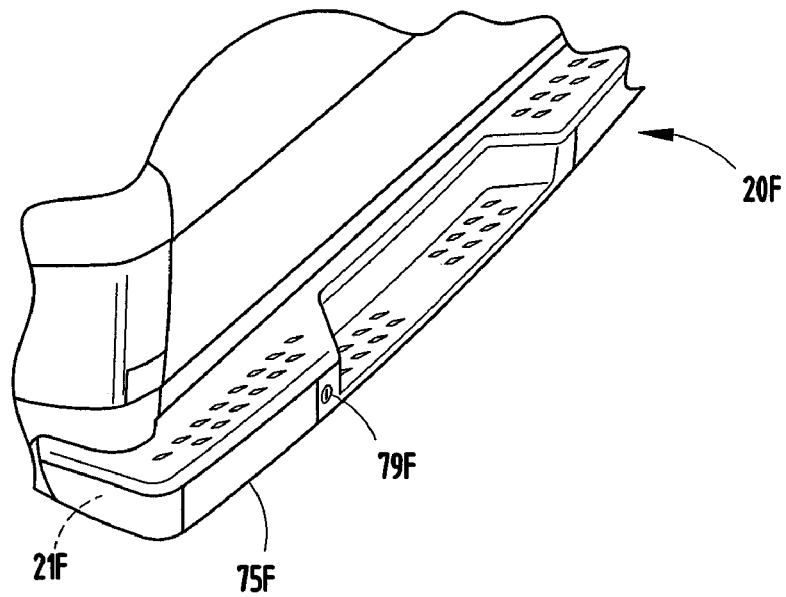
Figure 11:
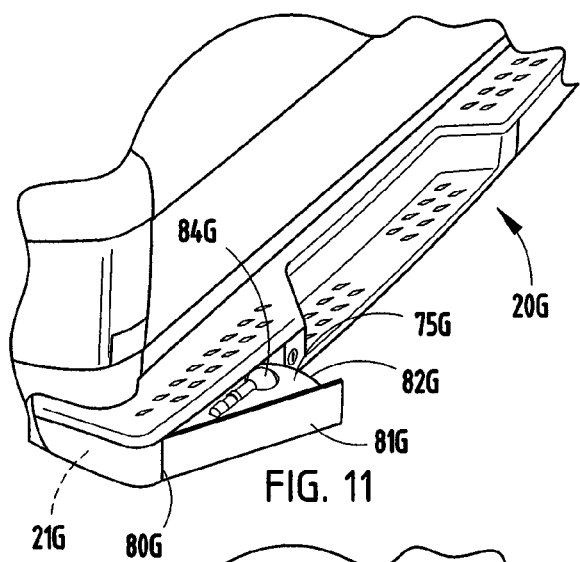
FIGS. 11-12 are exploded perspective views of an eighth bumper system with lockable pivoting storage bin within the end section of the beam, FIG. 11 showing the bin in the open position, and FIG. 12 showing an opposing view of the open bin.

The bumper system 20F (FIG. 9) includes a beam 21F with a modified end section 26F having a forwardly-facing pocket 74F formed therein for receiving a storage bin 75F (also called a "storage module" herein). The lower trim component 23F includes a mounting plate 51F modified to define an aperture 77F large enough for the bin 75F to slide through. The cover sheet of material 52F is made in two parts, one part 52F' being attached to the outboard portion of the mounting plate 51F, and the other part 52F'' being attached to a support panel 78F on a front of the bin 75F for filling the aperture 77F when the bin 75F is positioned within the pocket 74F in a storage position (FIG. 10). It is contemplated that the bin 75F can be releasably retained in the pocket 74F by various means (e.g., by tracks limited in length, a tether, abutting stops, etc). The illustrated bin 75F is slidably supported for linear movement (i.e., like a desk drawer), but it can instead be pivotally supported for an arcuate swinging movement (see FIG. 11). A key lock 79F is mounted in the beam 21F, and the upper trim component 22F has an aperture that aligns with the key lock 79F for accessing the key lock 79F. The key lock 79F includes a locking flange 79F' movable to engage the bin 75F to prevent unauthorized access to the bin 75F.

The bumper system 20G (FIG. 11) is very similar to the bumper system 20F, except an outboard end of the bin 75G is pivotally hinged to the beam 21G at location 80G, such that the bin 75G opens along an outward-swinging arcuate path as shown by arrow 81G. The illustrated bin 75G includes an insert 82G with a recess shaped to receive and hold a ball hitch 84G. Notably, it is contemplated that other inserts can be provided, such as an insert for holding a jack, a wheel nut wrench, other hand tools, other accessories or equipment, etc.

Figure 12:
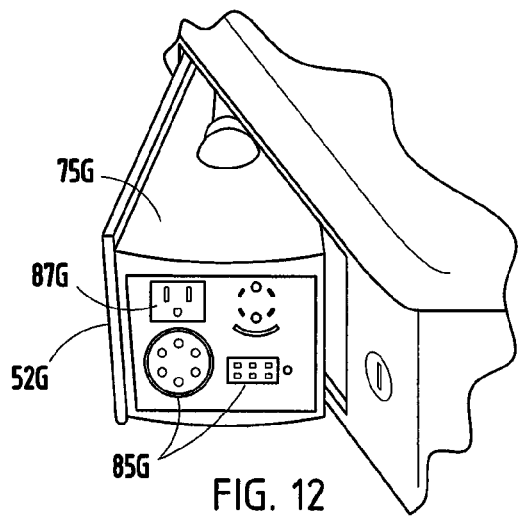

FIG. 12 shows that an inboard end of the bin 75G includes a plurality of electrical connectors, such as different trailer electrical connectors 85G, as well as a 12V DC jack for exterior vehicle power (such as for a light) and even a 120V jack 87G (such as for jumping 120V AC power into the vehicle or out from a generator in the vehicle truck bed for a contractor or construction worker). Other connectors for leisure and commercial uses are contemplated, such as for connection to a hydraulic system, a pneumatic system, and/or communication/sound systems. Notably, all connections are protected and in a hidden aesthetic position that does not detract from vehicle aesthetics when the bin 75G is closed and locked.

Figure 13:
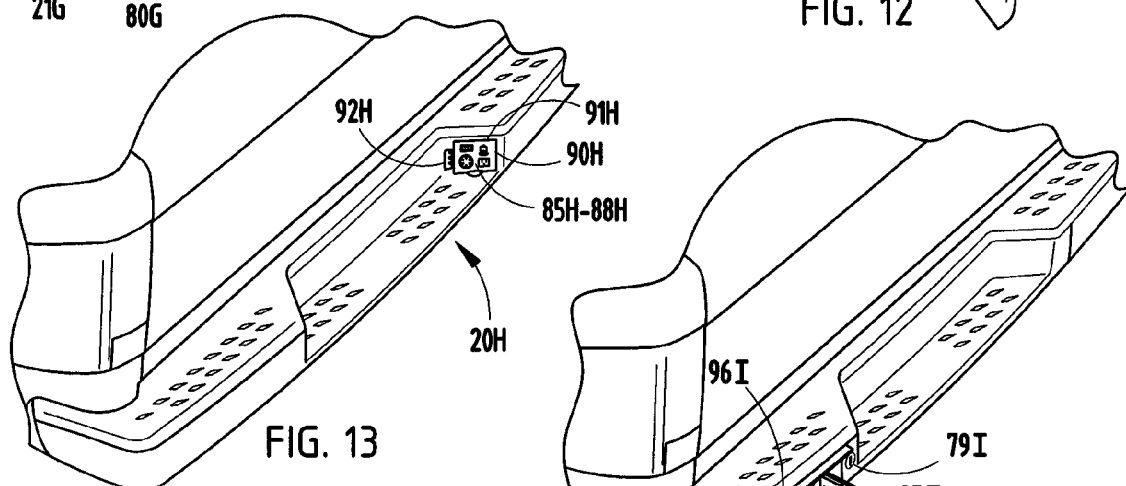
FIG. 13 is an exploded perspective view of a ninth bumper system where electrical connectors are positioned in the beam adjacent the license plate pocket, including a pull-out and drop-down cover for closing access to the electrical connectors.

FIG. 13 shows a bumper system 20H where a plurality of electrical connectors, such as electrical connectors 85H-88H are mounted in a panel 90H on one side of the step 25H. A cover/door 91H pulls out and drops down to cover the panel 90H. The cover 91H can include a lock to prevent unauthorized access to the connectors 85H-88H. A license plate light 92H can be positioned adjacent the panel 90H.

Figure 14:
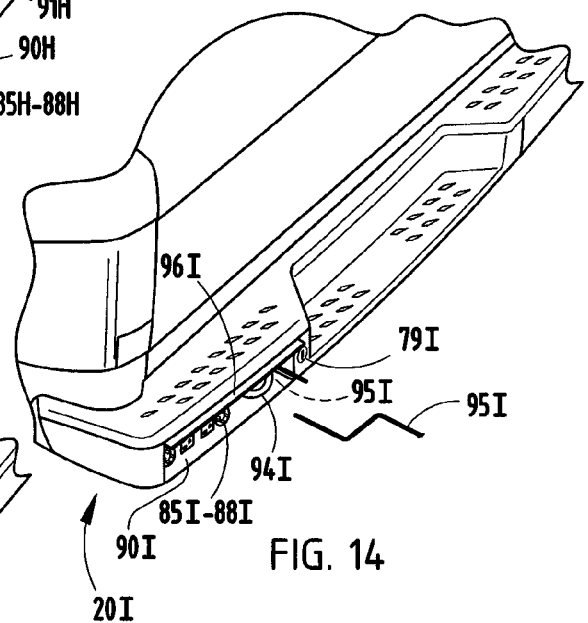
FIGS. 14-15 are exploded perspective views of a tenth bumper system where a pocket in the end section of the beam includes electrical connectors, a hole for access to the cable-winch spare tire retainer arrangement (see FIG. 14), a tow hook (see FIG. 15), and further includes a pull-out and drop-down lockable cover for closing access to the interior components.
Figure 15:
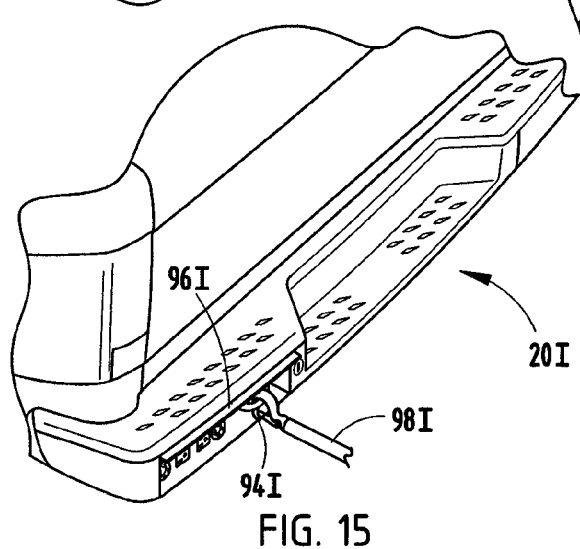

Bumper system 20I (FIG. 14) includes a panel 90I with electrical connectors 85I-88I, a tow hook 94I, and an aperture 95I for accessing a cable-winch system for holding a spare tire under the vehicle. A pull-out and drop-down cover/door 96I is attached above the panel 90I. A lock 79I is mounted in beam 21I for securing the door 96I to prevent unauthorized access. Notably, this can be important, since theft of vehicle spare tires is a recognized problem . . . and this arrangement would effectively prevent unauthorized access yet allow easy access while providing an attractive aesthetically acceptable appearance. As shown in FIG. 14, a tire winch crank can be accessed using a tire crank wrench 95I' when the door 96I is open. Also, as shown in FIG. 15, a tow cable 98I can be attached to the tow hook 94I when the door 96I is open.

Figure 16:
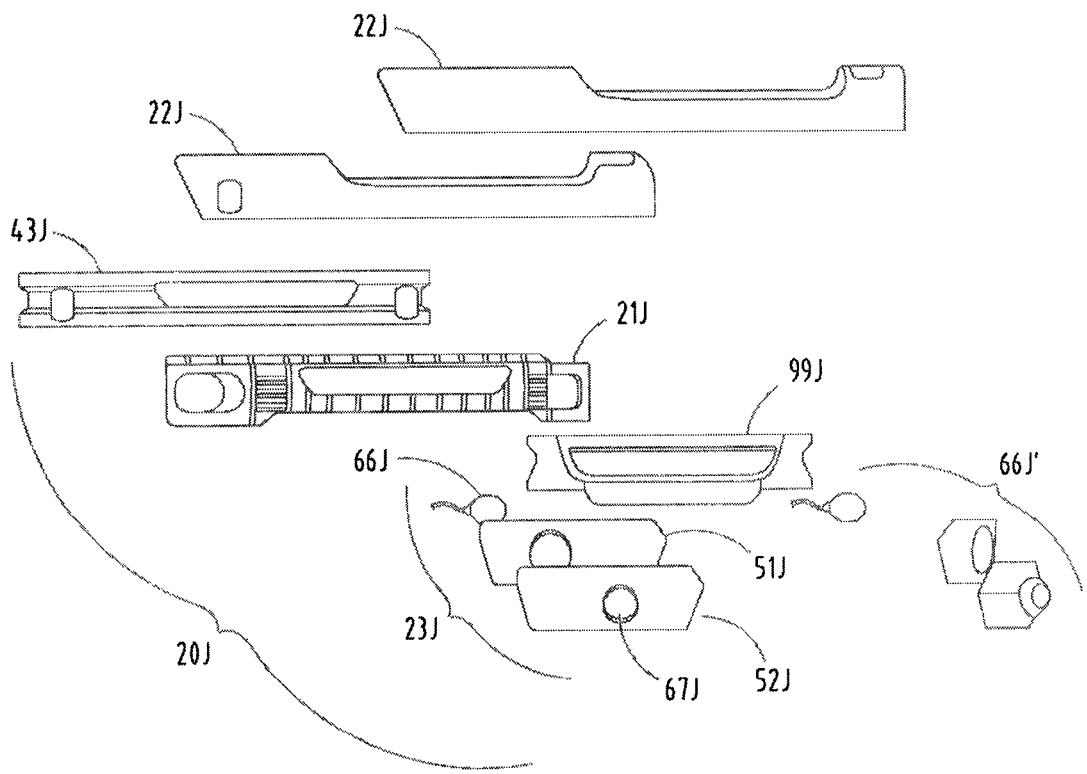
FIG. 16 is an exploded perspective view of an eleventh bumper system configured for use on a front of a vehicle.
Figure 17:
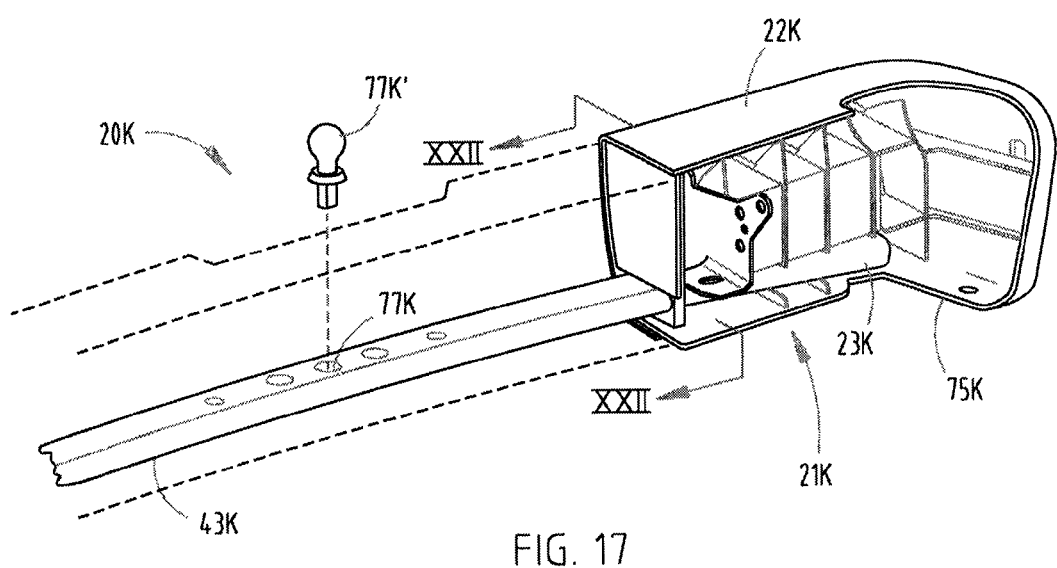
FIGS. 17-18 are rear perspective and top views illustrating a modified bumper system not totally dissimilar to the bumper system of FIGS. 1-2.
Figure 18:
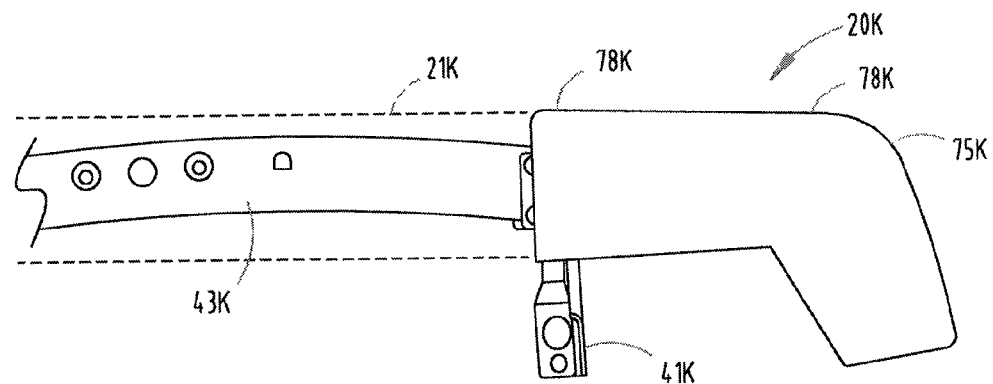

Bumper system 20J (FIG. 16) adopts many of the present concepts to the front of a vehicle. The bumper system 20J includes a cross beam 43J, a structural polymeric reinforcement beam 21J, and upper and lower trim components 22J and 23J. Also shown are a second upper trim component 22J' that can be substituted for trim component 22J, and that has a different surface treatment. The lower trim component 23J includes a mounting plate 51J and an aesthetic cover sheet 52J, both having an aperture 67J. A light assembly 66J fits into a mounting pocket 50J where it is located to shine through the aperture 67J. Additional lower trim components can be provided with different surface treatments, and with different configurations for different light positions and light sizes. For example, see the illustrated fog lamp assembly 65J'. An air deflector lower trim 99J is also shown for attachment along a bottom of the bumper system 20J.

Figure 19:
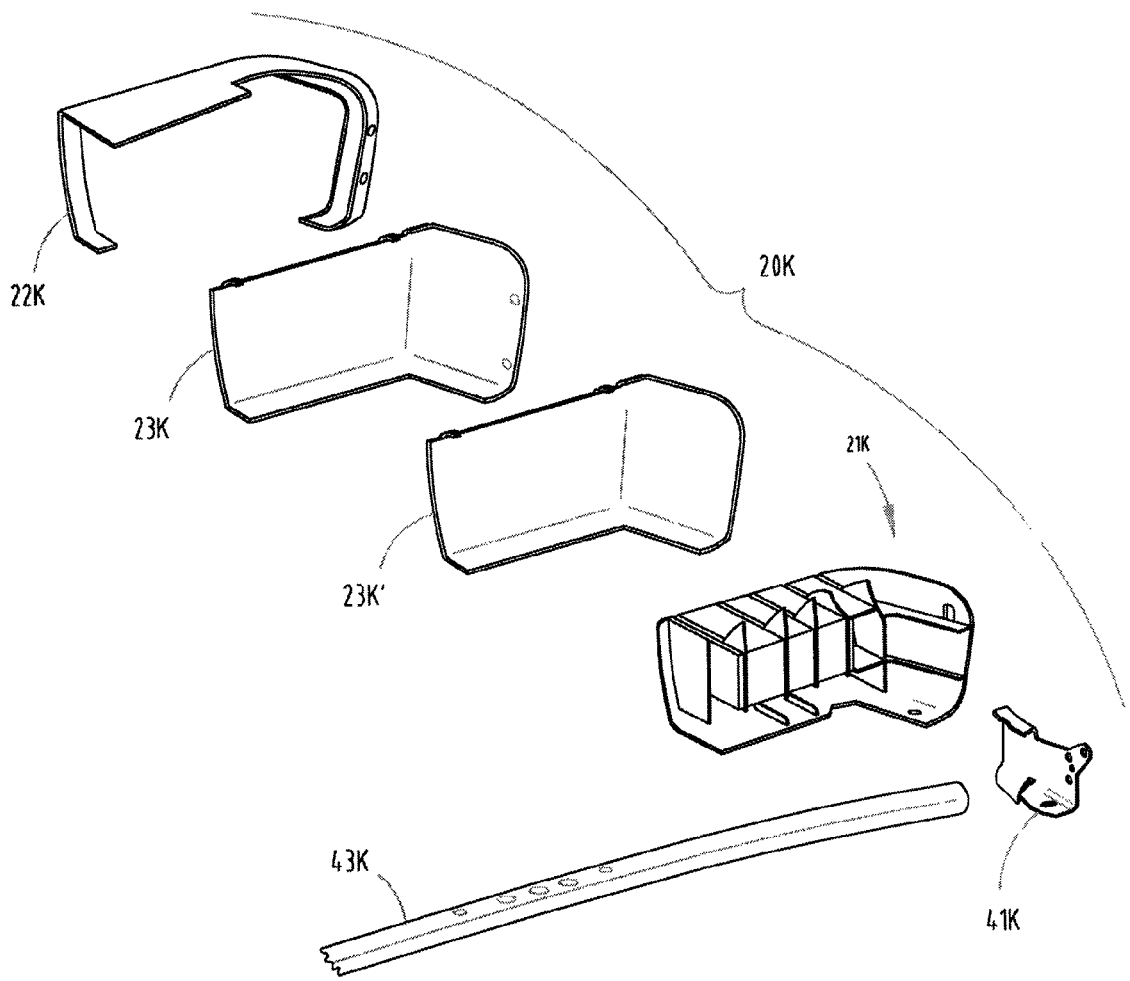
FIGS. 19-20 are rear and front exploded perspective views of FIG. 17.
Figure 20:
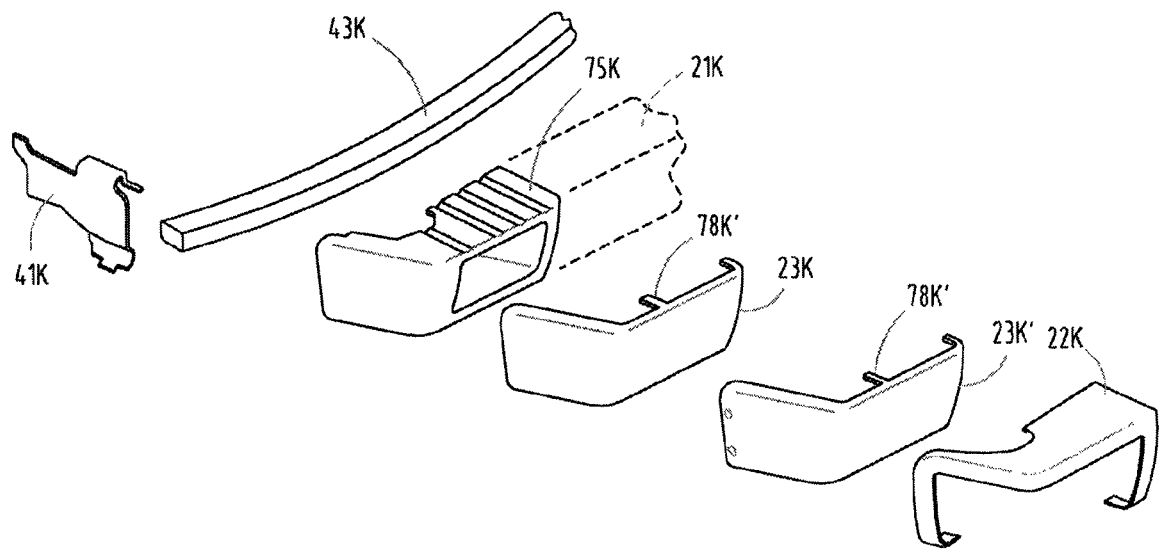
Figure 21:
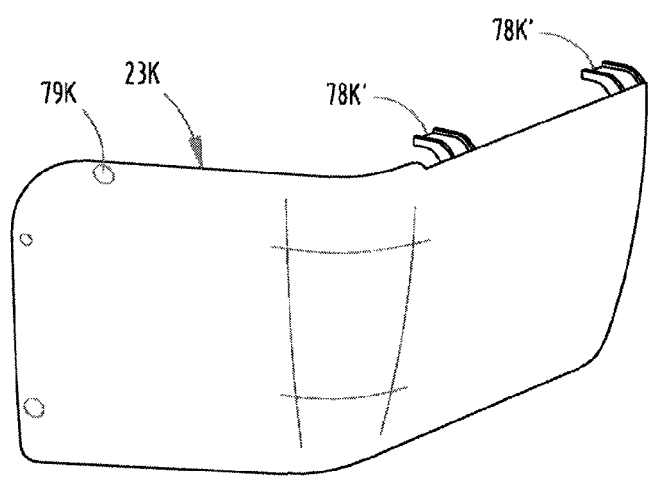
FIG. 21 is an enlarged perspective view of one of the trim components in FIG. 20.
Figure 22:
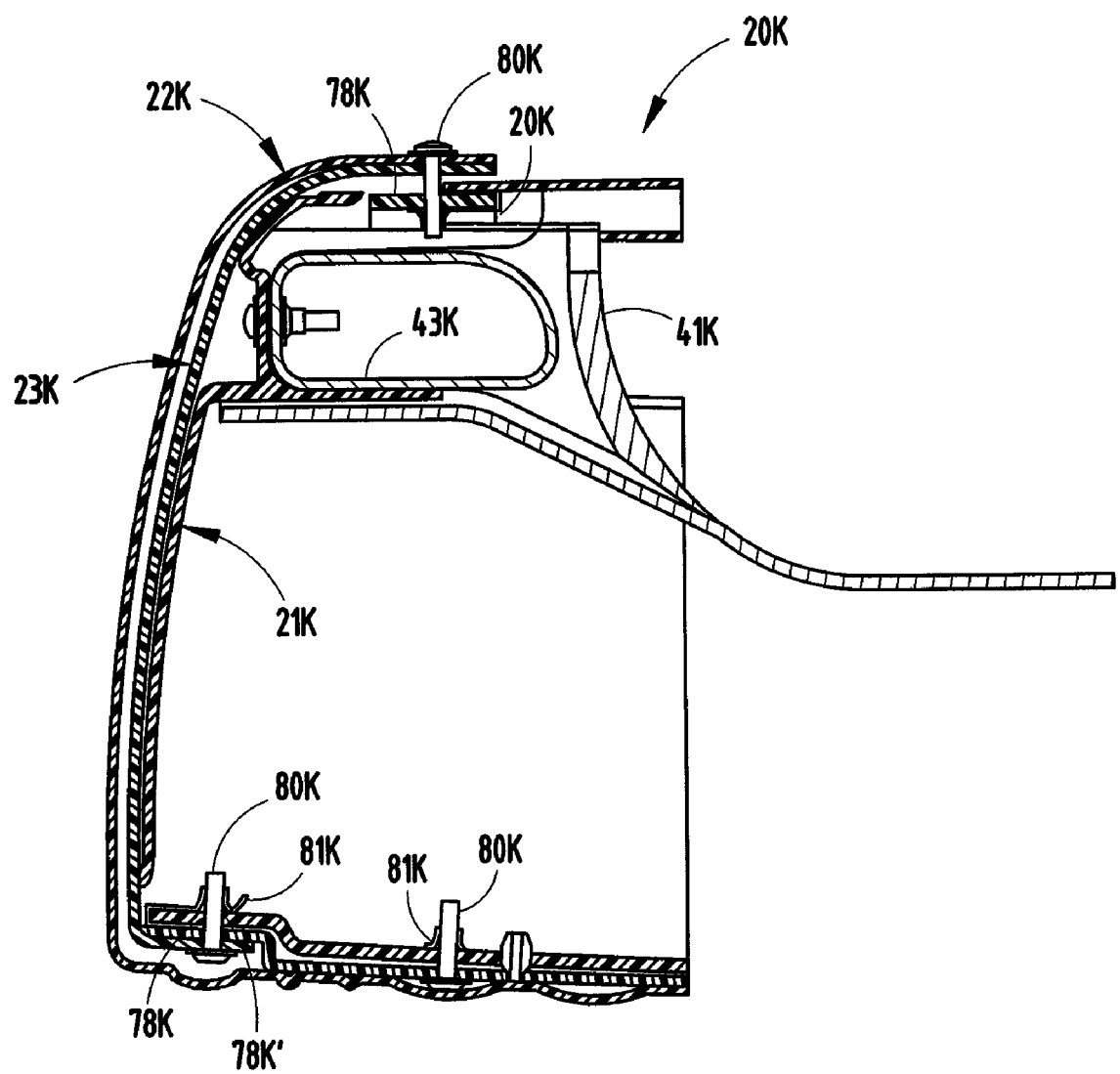
FIG. 22 is a vertical cross section taken along line XXII-XXII in FIG. 17.

Bumper system 20K (FIGS. 17-21) includes a cross beam 43K (FIG. 19), side rail brackets 41K for mounting beam 43K to a vehicle frame, a polymeric beam 21K with end sections 75K, upper trim component 22K, and lower trim component 23K (or alternative lower trim component 23K'). Notably, the trim components 22K and 23K (and 23K') can be designed to extend completely across a width of a vehicle, or can be made shorter in length as illustrated. The bumper end section 75K includes a pocket 76K formed by interconnected crisscrossing ribs and walls in the back side of the bumper beam 21K, the pocket 76K being shaped to matably receive the end of the cross beam 43K. The beam 43K includes a hole 77K (or multiple holes) for receiving and supporting a ball hitch 77K'. The end section 75K includes an outer surface shaped to matably engage and support the outer trim components 22K and 23K.

Apertured attachment pad locations 78K (FIG. 18) and apertured bosses are formed in the end section 75K for matably receiving and engaging apertured tabs 78K' extending from the trim components 22K and 23K (FIG. 20-21) and for engaging threaded fasteners 80K extended through holes 79K and into clip-on nuts 81K in the trim components 22K and 23K. The illustrated lower trim component 23K (also referred to as an "outer skin subcomponent") is a stamped steel applique, made to be light weight, such as from sheet steel of 0.5 to 1.0 mm thickness. It is contemplated that in some instances, the stamped steel applique will include a backer (also referred to as a "back-attached stiffener" or "stiffener subcomponent" herein) made of plastic. The backer stiffens and supports the sheet metal to provide optimal impact and dent resistance characteristics, and also includes the attachment tabs 78K' and holes 79K for attachment as discussed above and below. It is contemplated that the backer may be insert-molded onto a rear side of the stamped steel after the steel is stamped to form a three-dimensional shape, or the stiffener subcomponent can otherwise be attached by adhesives, bonded material, heat-staking, and other ways known in the art.

The illustrated lower trim component 23K' is a molded part made from lightweight polymeric material. The illustrated upper trim 22K is a step pad, and may be stamped from sheet metal, or molded of durable non-slip material, or a combination stamping with insert-molded backer. Notably, the upper trim 22K overlaps over edges of the lower trim component 23K (and 23K') to aesthetically cover and visually hide rough edges of the lower trim component, and to aesthetically cover and hide the attachment tabs 78K and fasteners extending through holes 79K. As noted above in earlier discussion, the trim components (including components 22K, 23K and 23K') can be treated in a wide variety of different ways, such as painting, color coating, molding to color (for when plastic), brushed, surface-textured, chrome-plated, and otherwise treated for optimal aesthetics. Notably, by substituting trim components that have different surface treatments and appearance, a wide variety of different looks can be quickly given to the vehicle, permitting on-site customization of the vehicle, such as at a car dealership.

Notably, each of the bumper systems above provide inexpensive and cost effective ways to achieve significant vehicle differentiation and brand recognition while providing useful features to the customer. Upgrading and also replacement of damaged components is made much easier and more cost effective. Many of the present bumper systems are sufficiently similar such that if one of them is validated through bumper impact testing according to federal motor vehicle safety standards and insurance industry impact testing requirements, then others will also meet impact test requirements without requiring revalidation testing. A reason is because the same structural members are used, with only trim components being substituted. Yet, the trim components allow wide variation in product styling, which is also a tremendous advantage of the present systems. By using the present system on both front and rear bumpers, and by matching body side moldings, unique ground-effect trim packages can be created at low cost and with relatively short lead times. This allows differentiation of models, and even allows individualization of specific vehicles. For example, by replacing the trim component 23 with trim component 23E that provides a backlit emblem, the bumper system can be quickly and easily individualized by replacing parts at a car dealership. Upgradeable features can be made within the same tooling, such as by using inserts within the tooling dies. It can also be done by secondary processing of parts . . . which can be easily done due to the lightweight nature of the trim components and the fact that their substitution does not cause the bumper system to require revalidation. Also, bumper systems can be upgraded for higher weight class hitches using "add-on" components and without requiring removal and disposal of existing parts.

Thus, the present bumper system offers the benefits of more comprehensive master planning, including commonization of tooling, reduced capital expenditure, more flexible manufacturing, reduced engineering, reduced validation, and increased ability to differentiate products. Further, the present bumper system offers shortened time cycles for changes, longer term styling change planning, consistency in engineering approach, and low cost even for significant styling differentiation. It does this by allowing significant styling and trim level changes at low cost and with short lead times, while adding attractive and desirable features for the end user. The present bumper systems allow vehicles to be individualized, which is particularly popular among truck users.

It is to be understood that variations and modifications can be made on the aforementioned structure without departing from the concepts of the present invention, and further it is to be understood that such concepts are intended to be covered by the following claims unless these claims by their language expressly state otherwise. s, can be made to be Class III or IV.

The embodiments of the invention in which an exclusive property or privilege is claimed are defined as follows:

1. A bumper system for a vehicle, comprising:
a structural reinforcement beam and one or more trim component covering visible portions of the beam; the beam having a center section forming a step, and end sections forming corners of the vehicle;
the one or more trim components having visible surfaces finished for aesthetics;
the beam including a bin extendable from a rear-facing cavity in the beam and carrying one or more functional components selected from a group consisting of: a storage pocket, a lighting mount, an accessory mount, an electrical connector for connection to trailer wiring, an electrical connector providing for a remote hookup to electrical power on an exterior of the vehicle, and a recess for receiving a tow hook in a partially hidden position; at least one of the trim components partially covering the beam and another of the at least one trim components covering a visible portion of the bin when in a closed, storage position in the cavity, wherein the bin is pivotably attached to the beam for movement.

2. The bumper system defined in claim 1, wherein the beam is made of polymeric material.

3. The bumper system defined in claim 2, including a cross beam, and wherein the reinforcement beam includes a back recess for matably receiving at least a portion of the cross beam, with the cross beam extending between sides of a vehicle frame.

4. The bumper system defined in claim 3, wherein the cross beam has a tubular cross section.

5. The bumper system defined in claim 3, wherein the cross beam forms a solid bar.

6. The bumper system defined in claim 1, wherein the functional component includes a storage pocket defined in the beam and haying lockable cover for closing the storage pocket.

7. A bumper system for a vehicle, comprising:
a structural reinforcement beam and one or more trim components covering visible portions of the beam; the beam having a center section and end sections forming corners of the vehicle;
the one or more trim components having visible surfaces finished for aesthetics;
the beam including a lockable module movably connected to the beam and extendable from a recess in the beam, the module including at least one electrical connector thereon that is hidden when the module is in the recess, the at least one trim components including a first trim covering a portion of the beam and a second trim covering a visible portion of the module when the module is in a closed position in the recess.

8. The bumper system defined in claim 7, wherein the module is slidably attached to the beam.

9. The bumper system defined in claim 7, wherein the module is pivotably attached to the beam.

10. The bumper system defined in claim 7, wherein the beam is made of polymeric material.

11. The bumper system defined in claim 10, including a cross beam, and wherein the reinforcement beam includes a back recess for matably receiving at least a portion of the cross beam, with the cross beam extending between sides of a vehicle frame.

12. The bumper system defined in claim 11, wherein the cross beam has a tubular cross section.

13. The bumper system defined in claim 11, wherein the cross beam forms a solid bar.

14. The bumper system definedin claim 7, wherein the lockable module includes a storage pocket defined in the beam and has a key lockable cover for closing the storage pocket.

* * * * *